(12) United States Patent
Obrador

(10) Patent No.: US 9,020,955 B2
(45) Date of Patent: Apr. 28, 2015

(54) COMPOSITIONAL BALANCE DRIVEN CONTENT RETRIEVAL

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2389 days.

(21) Appl. No.: 11/781,154

(22) Filed: Jul. 20, 2007

(65) Prior Publication Data

US 2009/0024579 A1 Jan. 22, 2009

(51) Int. Cl.
*G06F 17/30* (2006.01)

(52) U.S. Cl.
CPC ....... *G06F 17/30277* (2013.01); *Y10S 707/915* (2013.01)

(58) Field of Classification Search
CPC .......... G06F 17/3025; G06F 17/30256; G06F 17/30259; G06F 17/30244; G06F 7/0081; Y10S 707/915; G06K 9/46; G06K 9/52
USPC ................. 707/748, 755, 769, 915, 737, 749; 382/190, 220, 165, 195, 282
See application file for complete search history.

(56) References Cited

U.S. PATENT DOCUMENTS

| | | | | |
|---|---|---|---|---|
| 5,751,286 | A * | 5/1998 | Barber et al. ................. | 715/835 |
| 6,285,995 | B1 * | 9/2001 | Abdel-Mottaleb et al. ... | 707/737 |
| 6,445,834 | B1 * | 9/2002 | Rising, III ..................... | 382/305 |
| 7,136,511 | B2 | 11/2006 | Harrington et al. | |
| 2001/0046332 | A1 * | 11/2001 | Chang ............................ | 382/305 |
| 2002/0131641 | A1 * | 9/2002 | Luo et al. ....................... | 382/218 |
| 2003/0053673 | A1 * | 3/2003 | Dewaele ........................ | 382/132 |
| 2003/0076986 | A1 * | 4/2003 | Yoon et al. ..................... | 382/125 |
| 2005/0254727 | A1 | 11/2005 | Fedorovskaya | |
| 2006/0015496 | A1 | 1/2006 | Keating et al. | |
| 2006/0110062 | A1 | 5/2006 | Chiang et al. | |
| 2006/0143176 | A1 * | 6/2006 | Mojsilovic et al. ............... | 707/6 |
| 2006/0257050 | A1 * | 11/2006 | Obrador ........................ | 382/286 |
| 2007/0091106 | A1 | 4/2007 | Moroney | |
| 2007/0133842 | A1 | 6/2007 | Harrington | |
| 2007/0174872 | A1 * | 7/2007 | Jing et al. ......................... | 725/46 |
| 2007/0209025 | A1 * | 9/2007 | Jing et al. ...................... | 715/968 |
| 2007/0237308 | A1 * | 10/2007 | Reiner ........................... | 378/207 |
| 2008/0019669 | A1 * | 1/2008 | Girshick et al. ............... | 386/117 |

OTHER PUBLICATIONS

Claudio M. Privitera et al.;"Evaluating image processing algorithms that predict regions of interest";Neurology and Telerobotics Units, University of California, 486 Minor Hall, UC Berkeley; Apr. 20, 1998.*

Markkula, M.and Sormunen, E., "End-user searching challenges indexing practices in the digital newspaper photo archive," Information retrieval, 1:259-285, 2000.

Martinet, J., Chiaramella, Y. and Mulhem, P. "A model for weighting image objects in home photographs." in ACM CIKM'05, pp. 760-767, Bremen, Germany, 2005.

Obrador, P. "Automatic color scheme picker for document templates based on image analysis and dual problem," in Proc. SPIE, vol. 6076, San Jose, CA, 2006.

(Continued)

*Primary Examiner* — Dennis Truong

(57) ABSTRACT

Respective models of visual weight in images are determined. An image query is generated from a determined visual weight distribution. At least one of the images is retrieved from a database based on comparisons of the image query with respective ones of the visual weight models.

17 Claims, 11 Drawing Sheets

(56) References Cited

OTHER PUBLICATIONS

Obrador, P., "Content Selection based on Compositional Image Quality," in Proc. SPIE, vol. 6500, San Jose, CA 2007.

Savakis, A., Etz, S., and Loul A., "Evaluation of image appeal in consumer photography," in Proc. SPIE vol. 3959, 2000.

Smith, R. J. and Chang, S.-F. "Integrated Spatial and Feature Image Query, Multimedia Systems, 7(2):129-140, 1999."

M. Cadik et al., "Image attributes and quality for evaluation of tone mapping operators," In Proc. Pacic Graphics 2006, p. 35-44, National Taiwan U. Press, Taipei, Taiwan 2006.

H. Balinsky, "Evaluating interface aesthetics: a measure of symmetry", Digital Publishing Conference/IS & T/SPIE Int'l Symp. on Electronic Imaging, Jan. 2006, San Jose, CA USA.

S.J Harrington, J.F. Naveda, R.P. Jones, P. Roetling and N. Thakkar, "Aestheticmeasures for automated document layout", ACM Symposium on document engineering, 2004.

P. Obrador, "Multiresolution Color Patch Extraction", Electronic Imaging, VCIP Jan. 18, 2006, San Jose, CA USA.

H. Li and K.N. Ngan, "Unsupervised segmentation of defocused video based on matting model", ICIP 2006, Atlanta.

R. Ferzli and L. J. Karam, "A Human Visual System-Based Model for Blur/Sharpness Perception," 2nd Int'l Wkshop Vid. Process. and Qual. Metrics for Consumer Electr., Jan. 2006.

Shaked, D. and Tastl, I. , "Sharpness measure: towards automatic image enhancement", ICIP 2005. Sep. 11-14, 2005, vol. 1, on pp. I-937-I-940.

L. Itti, C. Koch, E. Niebur, "A model of saliency-based visual attention for rapid scene analysis", IEEE trans. on pat. analysis and mach. intel., (20)11:1254-1259 (1998).

Chao, H., Fan, J., "Layout and Content Extraction for PDF Documents." In proceeding of IAPR Int. workshop on Document Analysis System, 2004.

H. de Ridder et al., "Naturalness and image quality: chroma and hue variation in color images of natural scenes", Proceedings of SPIE 2411, 51-61 (1995).

Bajcsy, R. "Active Perception", Proceedings of the IEEE, vol. 76, No. 8, pp. 996-1005, 1988.

Corridoni et al., "Querying and retreiving pictorial data using semantics induced by colour quality and arrangement," Proc. Multimedia, 1996.

Vasile, A., Bender, W.R. Image query based on color harmony, in Proc. SPIE vol. 4299, San Jose, CA, 2001.

G. M. Johnson and M. D. Fairchild, "Measuring images: Differences, Quality, and Appearance," Proc SPIE/IS&T Electronic Imaging Conference, Santa Clara, 5007, 51-60 (2003).

"CopySpace(TM)—How it works," iStock International, http://www.istockphoto.com/copyspace_guide.php (downloaded Jul. 13, 2007).

Li-Qun Chen et al., "A visual attention model for adapting images on small displays," ACM Multimedia Systems Journal, 9(4):353-364, Nov. 2003.

Bringier et al., "No-reference perceptual quality assessment of colour image," EUSIPCO 2006, Florence, Italy (Sep. 4-8, 2006).

Oge Marques et al., "An attention-driven model for grouping similar images with image retrieval applications," EURASIP J. Adv. Sig Proc., v2007.

N. Burningham et al., "Image Quality Metrics," Processing, Image Quality, Image Capture Systems Conference (2003).

\* cited by examiner

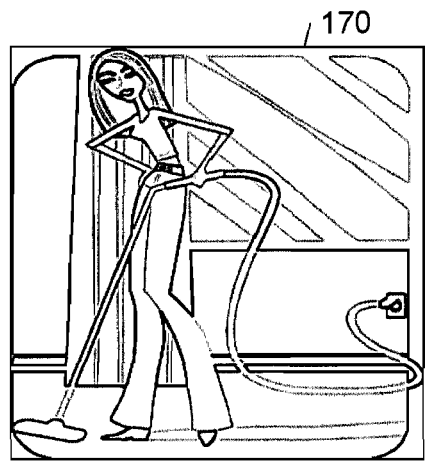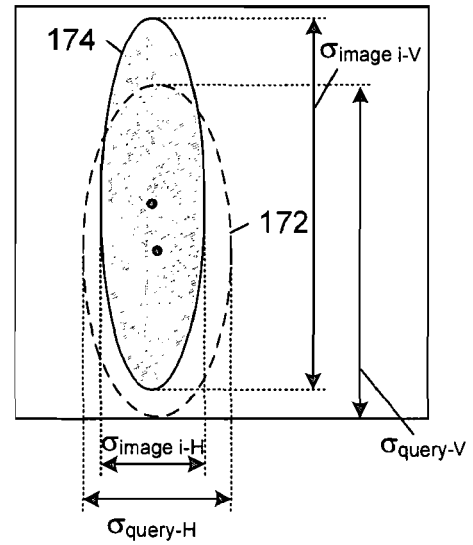
FIG. 20  FIG. 21
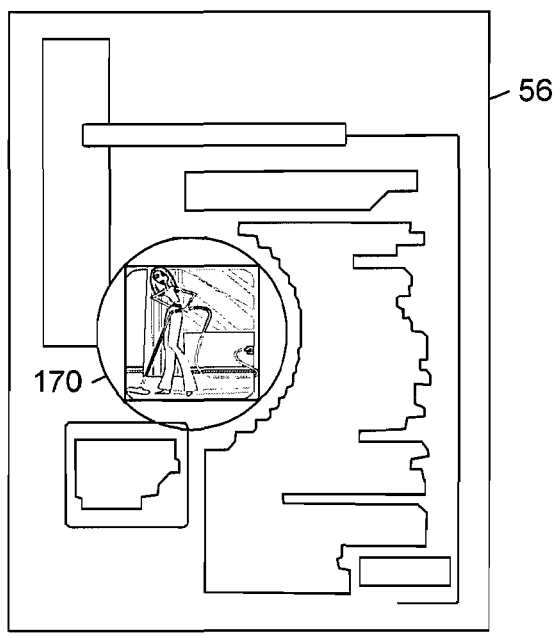
FIG. 22

COMPOSITIONAL BALANCE DRIVEN CONTENT RETRIEVAL

CROSS-REFERENCE TO RELATED APPLICATIONS

This application relates to the following co-pending applications, each of which is incorporated herein by reference:

U.S. patent application Ser. No. 11/496,146, filed Jul. 31, 2006;

U.S. patent application Ser. No. 11/495,846, filed Jul. 27, 2006;

U.S. patent application Ser. No. 11/495,847, Jul. 27, 2006;

U.S. patent application Ser. No. 11/127,278, filed May 12, 2005; and

U.S. patent application Ser. No. 11/259,597, filed Oct. 25, 2005

BACKGROUND

Individuals and organizations are rapidly accumulating large collections of digital content, including text, audio, graphics, animated graphics and full-motion video. This content may be presented individually or combined in a wide variety of different forms, including documents, presentations, still photographs, commercial videos, home movies, and meta data describing one or more associated digital content files. As these collections grow in number and diversity, individuals and organizations increasingly will require systems and methods for retrieving the digital content from their collections.

Among the ways that commonly are used to retrieve digital content from a collection are browsing methods and text-based retrieval methods. Browsing methods involve manually scanning through the content in the collection. Browsing, however, tends to be an inefficient way to retrieve content and typically is useful only for small content collections. Text-based retrieval methods involve submitting queries to a text-based search engine that matches the query terms to textual metadata that is associated with the content. Text-based retrieval methods typically rely on the association of manual annotations to the content, which requires a significant amount of manual time and effort.

Content-based retrieval methods also have been developed for retrieving content based on the actual attributes of the content. Content-based retrieval methods involve submitting a description of the desired content to a content-based search engine, which translates the description into a query and matches the query to one or more parameters that are associated with the content. Some content-based retrieval systems support query-by-text, which involves matching query terms to descriptive textual metadata associated with the content. Other content-based retrieval systems additionally support query-by-content, which involves interpreting a query that describes the content in terms of attributes such as color, shape, and texture, abstractions such as objects, roles, and scenes, and subjective impressions, emotions, and meanings that are assigned to the content attributes. In some content-based image retrieval approaches, low level visual features are used to group images into meaningful categories that, in turn, are used to generate indices for a database containing the images. Exemplary low level features include texture, shape, and layout. The parameters (or terms) of an image query may be used to retrieve images in the databases that have indices that match the conditions in the image query. In general, the results of automatic categorization and indexing of images improve when the features that are used to categorize and index images accurately capture the features that are of interest to the person submitting the image queries.

A primary challenge in the design of a content-based retrieval system involves identifying meaningful attributes that can be extracted from the content and used to rank the content in accordance with the degree of relevance to a particular retrieval objective.

SUMMARY

In one aspect, the invention features a method in accordance with which respective models of visual weight in images are determined. An image query is generated from a determined visual weight distribution. At least one of the images is retrieved from a database based on comparisons of the image query with respective ones of the visual weight models.

The invention also features apparatus and machine readable media storing machine-readable instructions for implementing the method described above.

Other features and advantages of the invention will become apparent from the following description, including the drawings and the claims.

DESCRIPTION OF DRAWINGS

FIG. 20 is a diagrammatic view of an exemplary image.

FIG. 21 is a diagrammatic view of the visual weight model of the document shown in FIG. 7 superimposed on a visual weight model of the image of FIG. 20.

FIG. 22 is a diagrammatic view of the image of FIG. 20 inserted into the document of FIG. 8.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. INTRODUCTION

The embodiments that are described in detail herein are capable of retrieving images (e.g., digital photographs, video frames, scanned documents, and other image-based graphic objects including mixed content objects) based on specified compositional balance criteria. In some of these embodiments, images are indexed in accordance with models of their respective distributions of visual weight. Images are retrieved based on comparisons of their associated visual weight based indices with the parameters of the compositional balance driven image queries.

Some of these embodiments generate the visual weight based indices from a model of image visual appeal that correlates with visual weight. In this way, these embodiments are able to preferentially retrieve images that not only meet the compositional balance criteria specified in the image queries, but also are visually appealing.

Some embodiments also are able to generate compositional balance driven queries from an analysis of visual weight distribution in a document and a specified compositional balance objective. In this way, these embodiments may be used, for example, in digital publishing application environments to automatically retrieve one or more images that satisfy a compositional balance objective for a document under construction.

II. OVERVIEW

Figure 1:
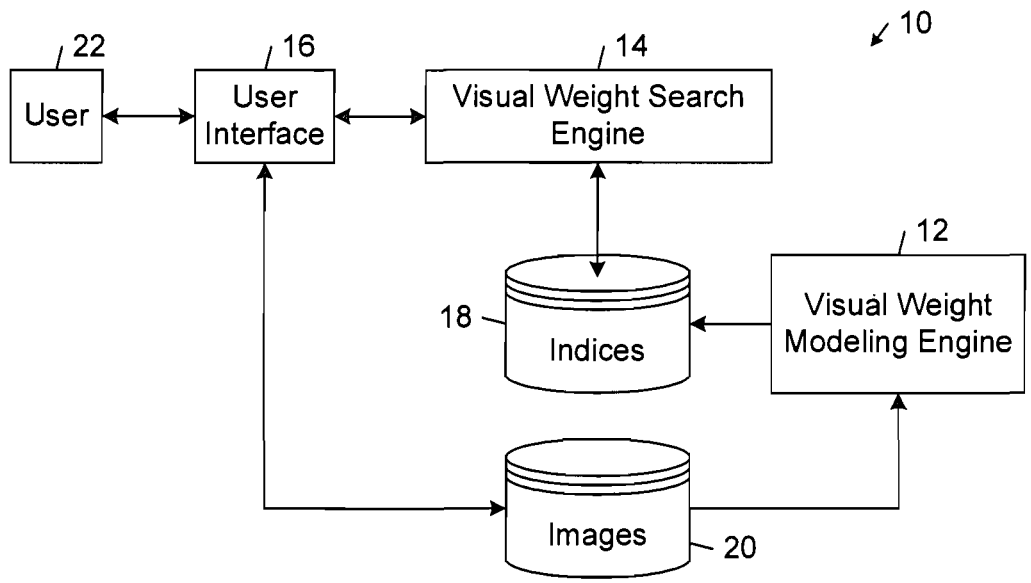
FIG. 1 is a block diagram of an embodiment of a compositional balance driven content retrieval system.

FIG. 1 shows an embodiment of a compositional balance driven content retrieval system 10 that includes a visual weight modeling engine 12, a visual weight search engine 14, and a user interface 16. The visual weight modeling engine 12 builds a respective index 18 for each of the images 20 in a collection. The images 20 may be stored in one or more local or remote image databases. Each of the indices 18 typically is a pointer to a respective one of the images 20. The visual weight search engine 14 receives search parameters from the user interface 16, constructs image queries from the received parameters, compares the image queries to the indices 18, and returns to the user interface 16 ones of the indices 18 that are determined to match the image queries. The user interface 16 allows a user 22 to interactively specify search parameters to the visual weight search engine 14, browse the search results (e.g., thumbnail versions of the matching images), and view ones of the images that are associated to the matching indices returned by the visual weight search engine 12.

Figure 2:
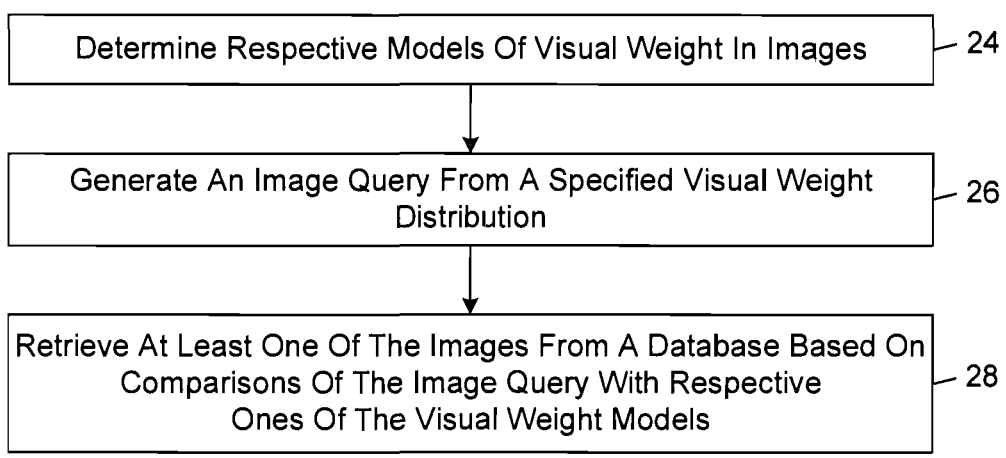
FIG. 2 is a flow diagram of an embodiment of a compositional balance driven content retrieval method.

FIG. 2 shows an embodiment of a compositional balance driven content retrieval method that is implemented by the compositional balance driven content retrieval system 10 to enable a compositional balance driven content retrieval of images from the one or more local or remote image databases.

The visual weight modeling engine 12 determines respective models of visual weight in the images 20 (FIG. 2, block 24). In this process, the visual weight modeling engine 12 typically extracts features (or attributes) from each image 20 and constructs a respective model of visual weight in the image from the extracted features. The visual weight modeling engine 12 creates a respective index 18 from parameters of each of the visual weight models and associates the respective index to the corresponding image. The visual weight modeling engine 12 may store the indices 18 in a database separate from the images (as shown in FIG. 1) or it may store the indices with metadata that is associated with corresponding ones of the images 20. The visual weight modeling engine 12 typically performs the visual weight modeling of the images 20 as an offline process.

The visual weight search engine 14 generates an image query from a specified visual weight distribution (FIG. 2, block 26). As explained in detail below, the visual weight distribution may be specified in terms of a query model of the desired visual weight in the images sought by the user 22. In some embodiments, the compositional balance driven content retrieval system 10 infers the visual weight query model automatically from an analysis of a document being constructed by the user and a specified compositional balance objective for the document. In other embodiments, the compositional balance driven content retrieval system 10 receives from the user interface 16 a direct specification by the user 22 of the desired visual weight distribution in the images to be retrieved by the system 10.

The compositional balance driven content retrieval system 10 retrieves at least one of the images from a database based on comparisons of the image query with respective ones of the models of visual weight in the images 20 (FIG. 2, block 28). In this process, the visual weight search engine 14 compares the image query to the indices 18 and returns to the user interface 16 ones of the indices 18 that match the image queries. The visual weight search engine 14 ranks the indices 18 based on a scoring function that produces values indicative of the level of match between the image query and the respective indices 18, which define the respective models of visual weight in the images 20. The user 22 may request the retrieval of one or more of the images 20 associated to the results returned by the visual weight search engine 14. In response, the user interface 16 (or some other application) retrieves the requested images from the one or more local or remote image databases. The user interface 16 typically queries the one or more databases using ones of the indices returned by the visual weight search engine 14 corresponding to the one or more images requested by the user 22.

III. COMPOSITIONAL BALANCE

Compositional balance refers to a quality of a composition (or layout) of objects in a document. In particular, compositional balance refers to the degree to which the visual weight distribution of the objects in the document conforms to a compositional objective.

Visual weight (also referred to as "optical weight" or "dominance") of an object refers to the extent to which the object stands out in a particular composition. The visual weight typically is affected by the object's shape, color, and size. In some embodiments, the visual weight of an object is defined as its area times its optical density.

Common compositional objectives include symmetrical balance, asymmetrical balance, and centered balance.

Figure 3:
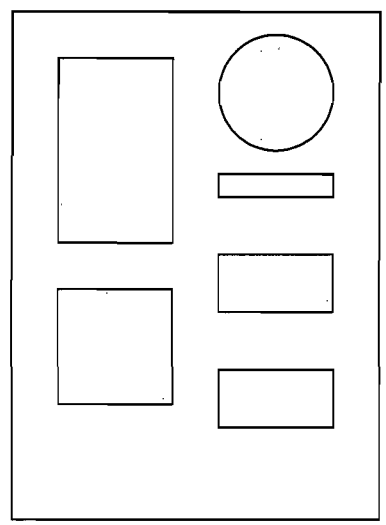
FIG. 3 is a diagrammatic view of a document that has a left-right symmetrical balance distribution of constituent objects.

Symmetrical balance gives a composition harmony, which gives a feeling of permanence and stability. One type of symmetrical balance is bilateral symmetry (or axial symmetry), which is characterized by one side of a composition mirroring the other. Examples of bilateral symmetry include left-right bilateral symmetry and top-bottom bilateral symmetry. FIG. 3 shows an example of a composition of objects that is characterized by left-right symmetrical balance. Another type of symmetrical balance is radial symmetry, which is characterized by the composition being mirrored along both horizontal and vertical axes.

Figure 4A:
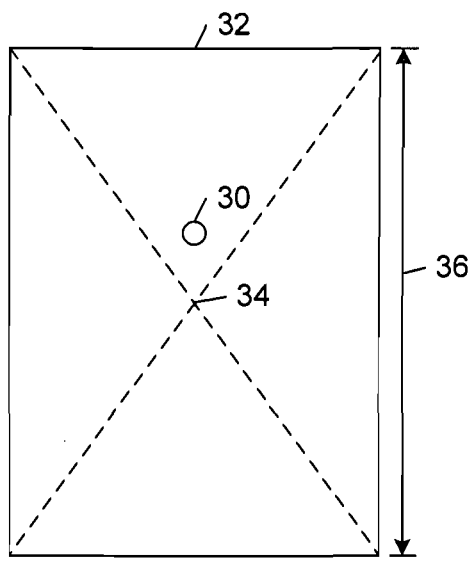
FIG. 4A is a diagrammatic view of a document showing the visual center of the document and the true center of the document.
Figure 4B:
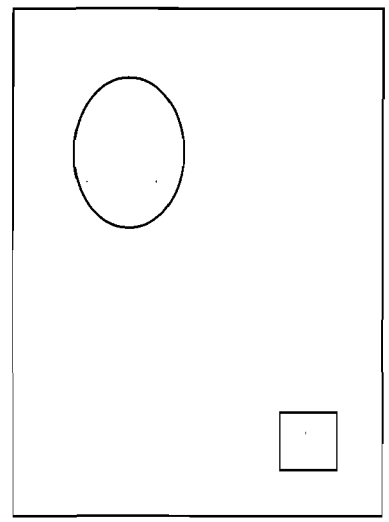
FIG. 4B is a diagrammatic view of a document that has a centered symmetrical balance distribution of constituent objects.

Asymmetrical balance gives a composition contrast, which creates interest. Asymmetrical balance typically is achieved by laying out objects of unequal visual weight about a point (referred to as the "fulcrum") in the composition such that objects having higher visual weight are closer to the fulcrum than objects that have lower visual weight. The fulcrum may correspond to the center (i.e., the true center) of a document, but it more commonly corresponds to a visual center (also referred to as the "optical center") of the document. As shown in FIG. 4A, the visual center 30 of a document 32 typically is displaced from the true center 34 of the document 32. The visual center commonly is displaced from the true center toward the top of the document a distance that is approximately 12.5% (or one-eighth) of the length of the vertical dimension 36 of the document. One type of asymmetrical balance is centered asymmetrical balance, which is characterized by an arrangement of objects of unequal weight that are balanced about a fulcrum located at a central point (typically the visual center) in a document. FIG. 4B shows an example of a composition of objects that is characterized by centered asymmetrical balance.

A composition is center balanced when the center of visual weight of the objects coincides with the visual center of the document in which the objects are composed. The objects in the composition shown in FIG. 4B are center balanced.

IV. COMPOSITIONAL BALANCE DRIVEN CONTENT RETRIEVAL

A. Generating Image Queries for Compositional Balance Driven Content Retrieval

1. Overview

As explained above, the visual weight search engine 14 generates an image query that is used to retrieve at least one of the images from a database based on comparisons of the image query with respective ones of the visual weight models of the images 20.

Figure 5:
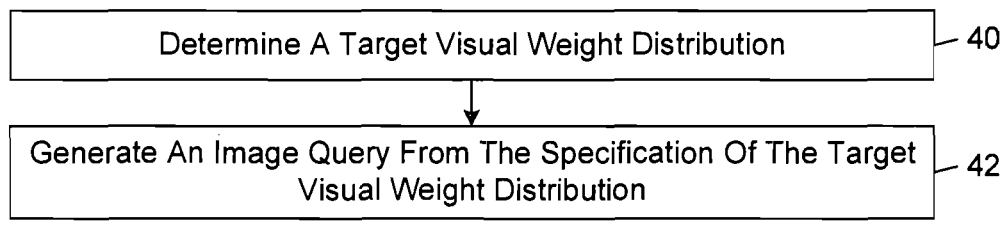
FIG. 5 is a flow diagram of an embodiment of a method of generating a visual weight query.

FIG. 5 shows an embodiment of a method by which an embodiment of the visual weight search engine 14 generates a visual weight query. In accordance with this method, the visual weight search engine 14 determines a target visual weight distribution (FIG. 5, block 40). The visual weight search engine 14 then generates an image query from the specification of the target visual weight distribution (FIG. 5, block 42).

2. Document-Based Image Query Generation

In some embodiments, the compositional balance driven content retrieval system 10 infers a visual weight model corresponding to the target visual weight distribution automatically from an analysis of a document being constructed by the user and a specified compositional balance objective for the document.

Figure 6:
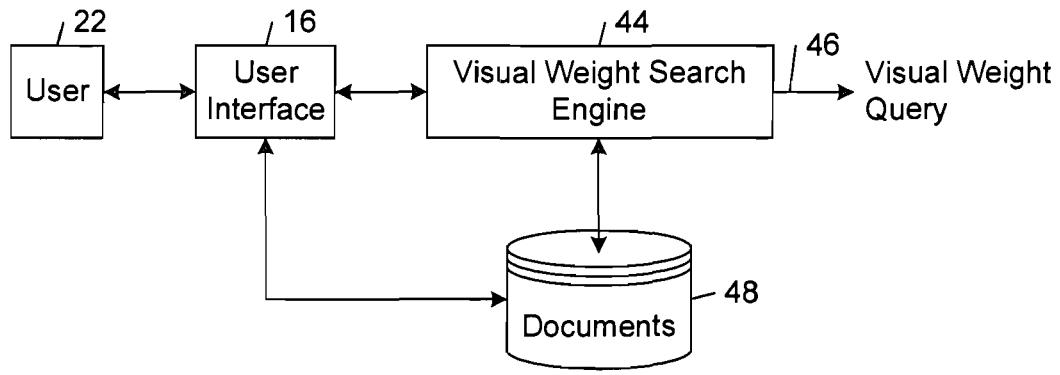
FIG. 6 is a block diagram of an embodiment of a system for generating a visual weight query.

FIG. 6 shows an embodiment 44 of the visual weight search engine 14 that generates a visual weight query 46 from a document and a compositional balance objective that are specified by the user 22 through the user interface 16. The document typically is stored in a local or remote computer-readable storage device 48 that is accessible by the user interface 16 and the visual weight search engine 44.

This embodiment of the visual weight search engine 14 has particular applicability to an application environment in which the user 22 is constructing a document and wishes to incorporate in the document an image that balances the other objects in the document in a way that achieves a particular compositional balance objective. In this case, the visual weight search engine 44 determines a model of the current visual weight distribution in the document and uses that model to form an image query that targets images having a visual weight distribution that complements the current visual weight distribution in the document in a way that achieves the user's compositional balance objective.

Figure 7:
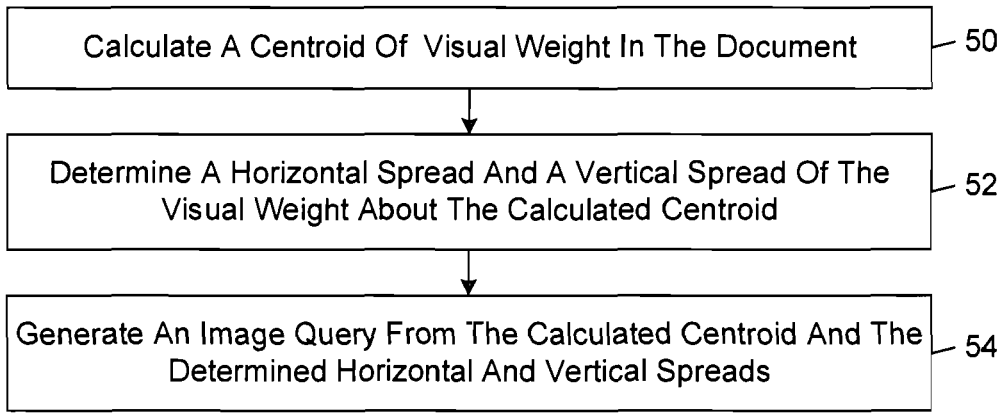
FIG. 7 is a flow diagram of an embodiment of a method of generating an image query from a determined visual weight distribution in a document.

FIG. 7 shows an embodiment of a method by which the visual weight search engine 44 generates an image query from a visual weight distribution in a document. In accordance with this method, the visual weight search engine 44 calculates a centroid of visual weight in the document (FIG. 7, block 50). The visual weight search engine 44 determines a horizontal spread and a vertical spread of the visual weight about the calculated centroid (FIG. 7, block 52). The visual weight search engine 44 generates an image query from the calculated centroid and the determined horizontal and vertical spreads (FIG. 7, block 54).

Figure 8:
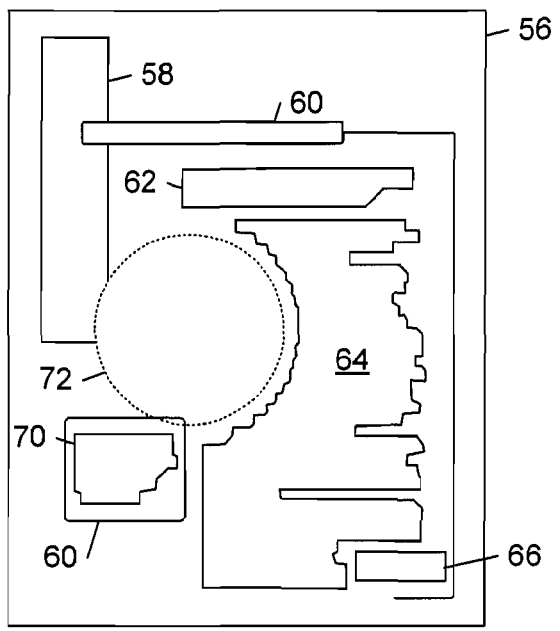
FIG. 8 is a diagrammatic view of a document that has a plurality of objects arranged in a compositional layout.
Figure 9:
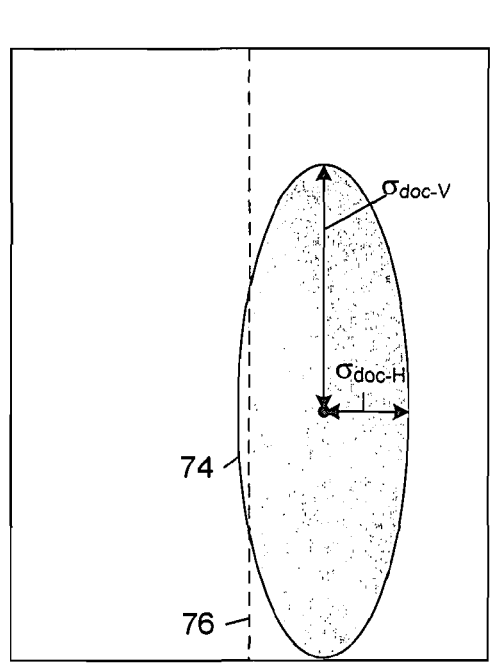
FIG. 9 is a diagrammatic view of an embodiment of a model of visual weight in the document shown in FIG. 8.
Figure 10:
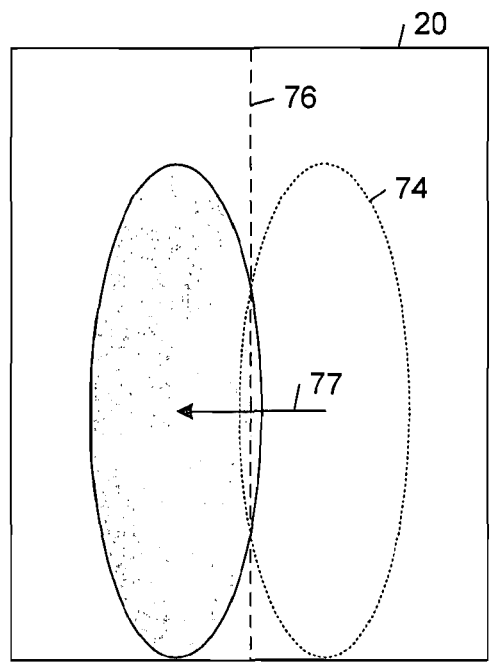
FIG. 10 is a diagrammatic view of a reflection of the visual weight model of FIG. 9 about a central vertical axis of the document shown in FIG. 8.

FIGS. 8-10 show an illustration of the operation of the visual weight search engine 44 in accordance with the method of FIG. 7 in the specific context of an exemplary document and an exemplary compositional balance objective that are specified by the user 22.

FIG. 8 shows an example of a document 56 that has a plurality of objects 58-70 that are arranged in a current compositional layout. In this example, the user 22 wants to insert an image in the area demarcated by the dashed circle 72. Through the user interface 16, the user 22 submits to the visual weight search engine 44 a request for a set of one or more images that have respective visual weight distributions that complement the current visual weight distribution in the document 56 to achieve a composition that has a left-right symmetrical balance.

In response to the user's request, the visual weight search engine 44 calculates a centroid of visual weight in the document (FIG. 7, block 50). In some embodiments, the visual weight search engine 44 calculates the document centroid ($x_{doc\text{-}centroid}$, $y_{doc\text{-}centroid}$) as a percentage of the document's horizontal and vertical dimensions ($D_{doc\text{-}H}$, $D_{doc\text{-}V}$) in accordance with equations (1) and (2):

$$x_{doc\text{-}centroid} = 100 \cdot \frac{\sum_j x_j \cdot E_j}{D_{doc\text{-}H} \cdot \sum_j E_j} \quad (1)$$

$$y_{doc-centroid} = 100 \cdot \frac{\sum_j y_j \cdot E_j}{D_{doc-V} \cdot \sum_j E_j} \quad (2)$$

where $(x_j, y_j)$ are the coordinates of the centroid of object j, and $E_j$ is the number of image forming elements (e.g., pixels) in object j. In some embodiments, the visual weight search engine 44 calculates the document centroid by weighting the horizontal and vertical coordinates in the document with the luminance values associated with those coordinates in accordance with equations (3) and (4).

$$x_{doc-centroid} = 100 \cdot \frac{\sum_i x_i \cdot L_i}{D_{doc-H} \cdot \sum_i L_i} \quad (3)$$

$$y_{doc-centroid} = 100 \cdot \frac{\sum_i y_i \cdot L_i}{D_{doc-V} \cdot \sum_i L_i} \quad (4)$$

In these equations, $x_i$ and $y_i$ are the x-coordinate and the y-coordinate of image forming element i in the document and $L_i$ is the luminance value of image forming element i.

The visual weight search engine 44 also determines a horizontal spread and a vertical spread of the visual weight about the calculated centroid (FIG. 7, block 52). In some embodiments, the horizontal and vertical spreads ($\sigma_{doc-H}$, $\sigma_{doc-V}$) correspond to the standard deviations of the luminance values about the centroid along the horizontal and vertical dimensions of the document expressed as percentages of the document's horizontal and vertical dimensions.

$$\sigma_{doc-H} = \frac{100}{D_{doc-H}} \cdot \sqrt{\frac{\sum_i^K [(x_i - x_{doc-centroid}) \cdot L_i]^2}{K \cdot \sum_i^K L_i^2}} \quad (5)$$

$$\sigma_{doc-H} = \frac{100}{D_{doc-V}} \cdot \sqrt{\frac{\sum_i^K [(y_i - y_{doc-centroid}) \cdot L_i]^2}{K \cdot \sum_i^K L_i^2}} \quad (6)$$

Where K is the number of image forming elements in the document.

FIG. 9 shows an embodiment of a model 74 of visual weight in the document 56 (see FIG. 7). In this embodiment, the visual weight model is an ellipse that has a centroid coincident with the center of visual weight in the document 56 (i.e., the calculated centroid location ($x_{doc-centroid}$, $y_{doc-centroid}$)) and horizontal and vertical dimensions equal to the horizontal spread and a vertical spread of the visual weight about the calculated centroid (i.e., $\sigma_{doc-H}$ and $\sigma_{doc-V}$) In other embodiments, the visual weight in the document may be modeled by a different shape, including but not limited to, for example, a rectangle, a circle, and a square.

The visual weight search engine 44 generates an image query from the calculated centroid ($x_{doc-centroid}$, $y_{doc-centroid}$) and the determined horizontal and vertical spreads ($\sigma_{doc-H}$, $\sigma_{doc-V}$) (FIG. 7, block 54). In this process, the visual weight search engine 44 geometrically transforms the model of visual weight in the document in accordance with the compositional balance objective, and produces the image query from attributes of the geometrically transformed visual weight model.

For example, if the compositional balance objective is left-right symmetrical balance, the visual weight search engine 44 transforms the visual weight model by reflecting the model about an axis parallel to a vertical dimension of the document and extending through a central point (e.g., the visual center) in the document, as suggested by the arrow 97 in FIG. 10. In some embodiments, the visual weight search engine 44 transforms the visual weight model by re-computing the horizontal coordinate of the document centroid about the central vertical axis 76 (see FIG. 10) in accordance with equation (7):

$$x_{query-centroid} = 100 - x_{doc-centroid} \quad (7)$$

The vertical coordinate of the document centroid and the horizontal and vertical visual weight spreads are unchanged. That is, $$y_{query-centroid} = y_{doc-centroid} \quad (8)$$

$$\sigma_{query-H} = \sigma_{doc-H} \quad (9)$$

$$\sigma_{query-V} = \sigma_{doc-V} \quad (10)$$

If the compositional balance objective is centered balance, the visual weight search engine 44 transforms the visual weight model by reflecting the model about an axis inclined with respect to horizontal and vertical dimensions of the document and extending through a central point (e.g., the visual center) in the document. In some embodiments, the visual weight search engine 44 transforms the visual weight model by re-computing the horizontal and vertical coordinates of the document centroid in accordance with equations (11) and (12):

$$x_{query-centroid} = 100 - x_{doc-centroid} \quad (11)$$

$$y_{query-centroid} = 100 - y_{doc-centroid} \quad (12)$$

The visual weight search engine 44 constructs the image query from the query parameters $\{x_{query-centroid}, y_{query-centroid}, \sigma_{query-H}, \sigma_{query-V}\}$. In some embodiments, the image query is an SQL query that selects one or more of the images 20 having respective visual weight model parameters that match the query parameters with the highest ranking scores as determined by a match scoring function (see §IV.C below).

3. Manual Image Query Generation

In some embodiments, the compositional balance driven content retrieval system 10 receives from the user interface 16 a direct specification by the user 22 of the desired visual weight in the images to be retrieved by the system 10.

Figure 11A:
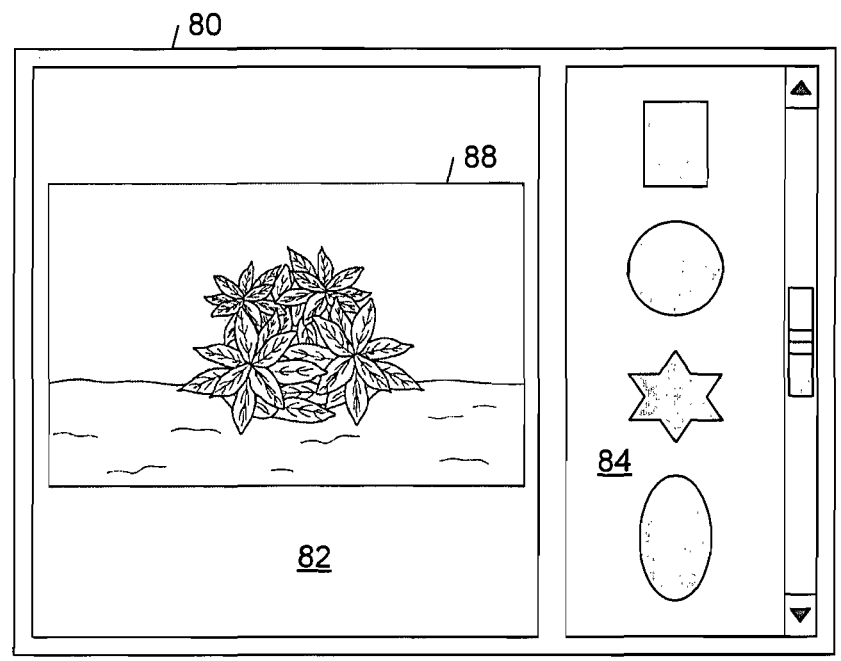
FIGS. 11A and 11B show a diagrammatic view of an embodiment of a user interface for specifying a visual weight distribution.
Figure 11B:
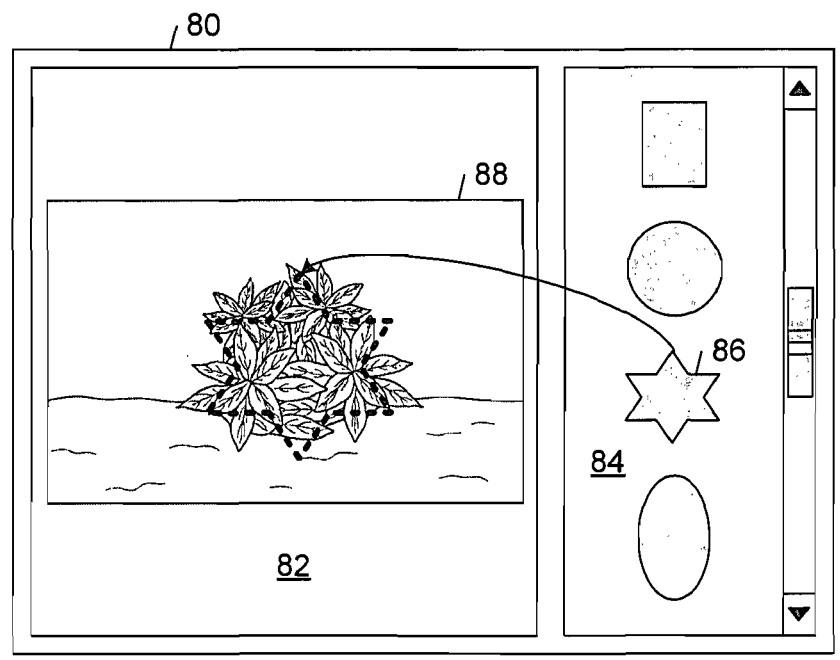

FIGS. 11A and 11B show a diagrammatic view of an embodiment 80 of the user interface 16 that allows the user 22 to specify a target visual weight distribution for the images that the user would like the visual weight search engine 14 to retrieve. The user interface 80 includes a visual weight distribution specification area 82 and a visual weight distribution template selection area 84. The user 22 can specify the target visual weight distribution by dragging a template (e.g., the star template 86) from the template selection area 84 into the specification area 82 and scaling the selected template to match the user's conception of the target visual weight distribution. In the illustrated embodiment, the specification area 82 is configured to allow the user 22 to view an image 88, as shown in FIG. 11A. The user may use the displayed image 88 as a guide for selecting and scaling the selected template to conform to a target visual weight distribution matching the perceived visual weight distribution in the image 88, as shown in FIG. 11B. The final shape, size, and location of the template correspond to the shape, size, and location of the target visual weight distribution. In some embodiments, the user interface 80 includes drawing tools that allow the user 22 to simply draw the shape of the target visual weight distribution with respect to a designated compositional area presented in the specification area 82.

After the user 22 has completed the specification of the graphical representation of the target visual weight distribution, the visual weight search engine 14 extracts parameters that define the shape, size, and location of that graphical representation and constructs and image query from the extracted parameters. In some embodiments, the image query is an SQL query that selects one or more of the images 20 having respective visual weight model parameters that match the query parameters with the highest ranking scores as determined by a match scoring function (see §IV.C below).

B. Indexing Images for Compositional Balance Driven Content Retrieval

1. Overview

The visual weight modeling engine 12 determines respective models of visual weight in the images 20 (see FIG. 2, block 24). In this process, the visual weight modeling engine 12 typically extracts features from each image 20 and constructs a respective model of visual weight in the image from the extracted features. In the embodiments described in detail below, the visual weight modeling engine 12 generates the visual weight based indices based on a model of image visual appeal that correlates with visual weight. In this way, these embodiments are able to preferentially retrieve images that not only meet the compositional balance criteria specified in the image queries, but also are visually appealing.

Figure 12:
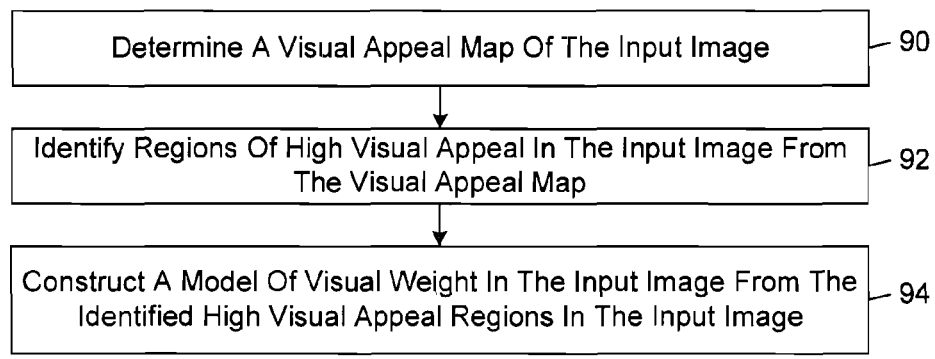
FIG. 12 is a flow diagram of an embodiment of a method of constructing a visual weight model of an image from a visual appeal map.

FIG. 12 shows an embodiment of a method by which the visual weight modeling engine 12 constructs a visual weight model of an input image from a visual appeal map. The input image is an image selected from the collection of images 20 that will be indexed by the visual weight indices 18 (see FIG. 1).

In accordance with the method of FIG. 12, the visual weight modeling engine 12 determines a visual appeal map of the input image (FIG. 12, block 90). The visual appeal map has values that correlate with the perceived visual quality or appeal of the corresponding areas of the input image. The visual weight modeling engine 12 identifies regions of high visual appeal in the input image from the visual appeal map (FIG. 12, block 92). The visual weight modeling engine 12 constructs a model of visual weight in the input image from the identified high visual appeal regions in the input image (FIG. 12, block 94).

Figure 13:
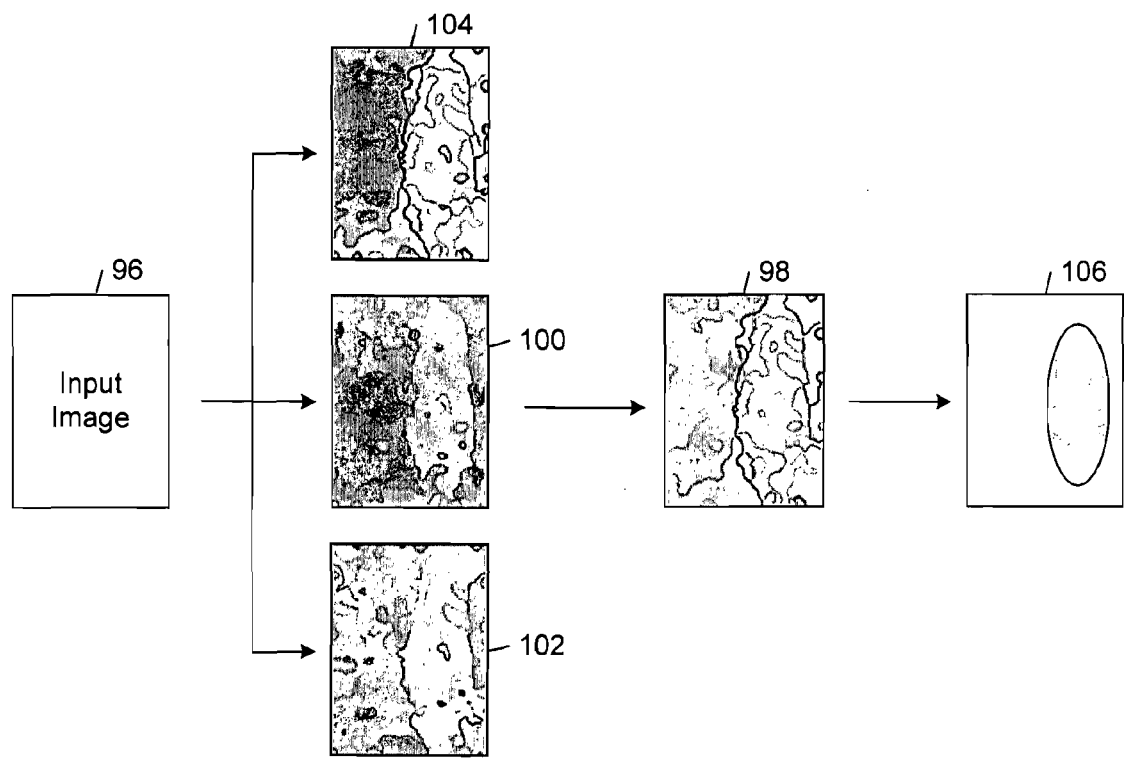
FIG. 13 is a diagrammatic view of various maps that are calculated in accordance with an embodiment of the method of FIG. 12.

FIG. 13 shows various maps that are calculated from an exemplary input image 96 in accordance with an embodiment of the method of FIG. 12. In the illustrated embodiment, a visual appeal map 98 is constructed from a contrast map 100, a color map 102, and a sharpness map 104. The contrast map 100 has values that correlate with the levels of contrast in the corresponding areas of the input image 96. The color map 102 has values that correlate with the levels of colorfulness in the corresponding areas of the input image 96. The sharpness map 104 has values that correlate with the levels of sharpness in the corresponding areas of the input image 96. The model 106 of visual weight in the input image 96 is constructed from the visual appeal map 98, as described in detail below.

2. Segmenting an Mage

In the illustrated embodiments, the visual appeal map is generated based on a region-(or object-) based processing of the input image. In this process, regions within the image are identified and the image forming elements within each region are assigned a single value that reflects the visual quality or appeal of that region. In this way, the image forming elements of each region of object are treated as having the same objective visual quality or appeal.

Figure 14:
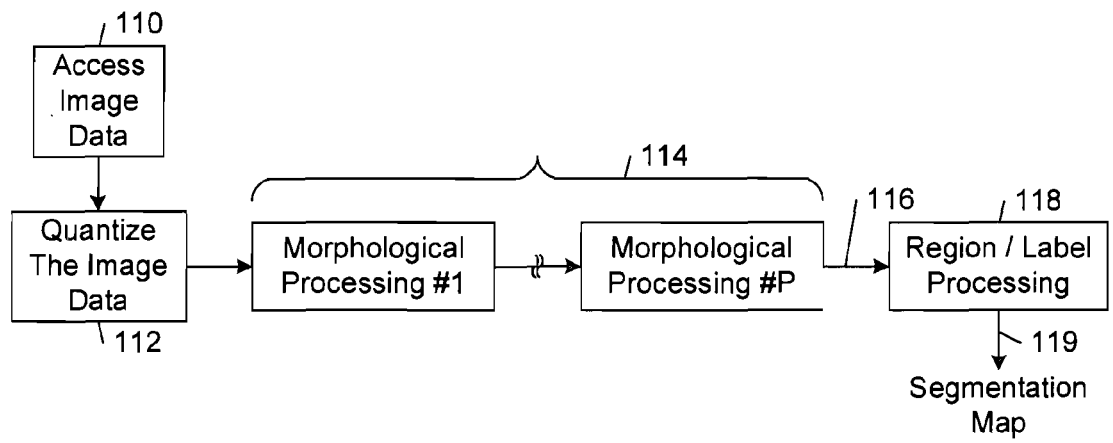
FIG. 14 is a block diagram of an embodiment of a method of segmenting an image.

FIG. 14 is a block diagram of an embodiment of a method of segmenting an input image.

In accordance with the method of FIG. 14, the visual weight modeling engine 12 accesses image data of the input image being processed (FIG. 14, block 110). In some embodiments, the image data are the color values (e.g., RGB values) of image forming elements (e.g., pixels) in the input image. In some embodiments, the visual weight modeling engine 12 may convert the image data to a desired color space (e.g., the CIE-Lab color space) before proceeding to the next processing stage.

The visual weight modeling engine 12 quantizes the image data (FIG. 14, block 112). In this process, the input image is quantized in accordance with a quantization table (or color palette). In one embodiment, lexical quantization is performed, for example, using one or more of the lexical quantization methods described in U.S. patent application Ser. No. 11/259,597, filed Oct. 25, 2005. In this process, individual image forming elements of the input image are associated with one of a plurality of lexical color names. Lexical quantization allows for a discrete outcome permitting filtering of non-consistent colors within a color patch or region. The result of the quantization process is a set of sparsely quantized images.

The visual weight modeling engine 12 performs morphological processing of the quantized image data (FIG. 14, stage 114). This process may include P levels of morphological processing (filtering) at different resolutions, where P has a positive integer value greater than zero. The output 116 of the morphological processing stage 114 identifies a plurality of regions of the input image. The constituent image forming elements in each of these regions have a common characteristic, such as a consistent color corresponding to one of the lexical color names in the quantization table.

The visual weight modeling engine 12 performs region/label processing of the input image based on the output 116 of the morphological processing stage 114 (FIG. 14, block 118). In the course of the region/label processing, the regions are labeled using lexical color names according to the consistent colors of the respective regions. In addition, some of the regions that are identified by the morphological processing of step S44 may be merged. For example, regions are merged if the visual weight modeling engine 12 determines that the regions correspond to a single portion or object of an original image (e.g., due to a color gradient occurring in the portion or object causing the lexical quantization of the portion or object to be classified into plural regions). The resulting segmentation map 119 is used by the visual weight modeling engine 12 to produce the visual appeal map, as described in detail below.

Additional details regarding the operation and various implementations of the color-based segmentation method of FIG. 14 are described in the following references, each of which is incorporated herein by reference: U.S. patent application Ser. No. 11/495,846, filed Jul. 27, 2006; U.S. patent application Ser. No. 11/495,847, Jul. 27, 2006; U.S. patent application Ser. No. 11,259,597, filed Oct. 25, 2005; Pere Obrador, "Multiresolution Color Patch Extraction," SPIE Visual Communications and Image Processing, San Jose, Calif., USA, pp. 15-19 (January 2006); and Pere Obrador, "Automatic color scheme picker for document templates based on image analysis and dual problem," in Proc. SPIE, vol. 6076, San Jose, Calif. (January 2006).

3. Producing a Visual Appeal Map of an Image

A. Overview

Figure 15:
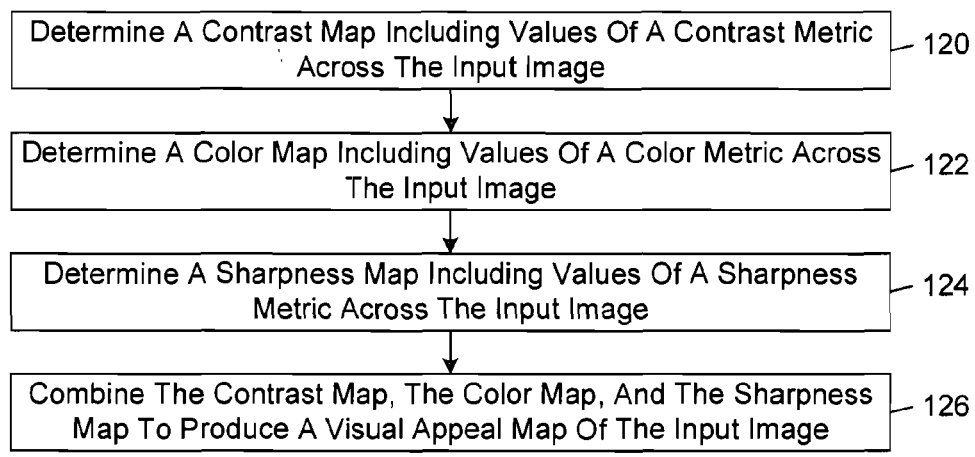
FIG. 15 is a flow diagram of an embodiment of a method of producing a visual appeal map of an image.

FIG. 15 is a flow diagram of an embodiment of a method of producing a visual appeal map of an image. In accordance with this method, the visual weight modeling engine 12 determines a contrast map that includes values of a contrast metric across the input image (FIG. 15, block 120). The visual weight modeling engine 12 determines a color map that includes values of a color metric across the input image (FIG. 15, block 122). The visual weight modeling engine 12 determines a sharpness map that includes values of a sharpness metric across the input image (FIG. 15, block 124). The visual weight modeling engine 12 combines the contrast map, the color map, and the sharpness map to produce a visual appeal map of the input image (FIG. 15, block 126).

b. Producing a Contrast Map of an Image

In general, the visual weight modeling engine 12 may determine the contrast map in any of a wide variety of different ways.

In some embodiments, the visual weight modeling engine 12 calculates a respective contrast value for each of the segmented regions of the input image in the contrast map in accordance with the image contrast quality scoring process described in U.S. Pat. No. 5,642,433.

In other embodiments, the visual weight modeling engine 12 calculates the respective contrast value for each image forming element location i in the contrast map by evaluating the measure of a root-mean-square contrast metric ($C_{RMS,i}$) defined in equation (13) for each segmented region $W_i$ in the input image.

$$C_{\text{RMS},i} = \sqrt{\frac{1}{n_i - 1} \cdot \sum_{j \in W_i} (x_j - \bar{x}_i)^2} \quad (13)$$

where $n_i$ is the number of image forming elements in the region $W_i$, $x_j$ is the normalized gray-level value of image forming element j in region $W_i$, $x_j$ has a value $0 \le x_j \le 1$, and $$\bar{x}_i = \frac{1}{n_i} \cdot \sum_{j \in W_i} x_j \quad (14)$$

In some embodiments, the visual weight modeling engine 12 computes the contrast measures $\Omega_{r,contrast}$ for each region in the contrast map by evaluating the contrast measure defined in equation (15) for each corresponding region $W_i$ in the input image.

$$\Omega_{i,contrast} = 1 \quad \text{if } L_{r,\sigma} > 100 \quad (15)$$
$$1 + L_{i,\sigma}/100 \quad \text{if } L_{r,\sigma} \le 100$$

where $L_{i,\sigma}$ is the respective variance of the luminance in the region $W_i$ in the input image.

c. Producing a Color Map of an Image

In general, the visual weight modeling engine 12 may determine the colorfulness map in any of a wide variety of different ways. In some embodiments, the visual weight modeling engine 12 calculates the respective color value for each of the segmented regions i in the color map in accordance with the color metric defined in equation (16):

$$M_{i,c} = \sigma_{i,ab} + 0.37 \mu_{i,ab} \quad (16)$$

In equation (16), the parameter $\sigma_{i,ab}$ is the trigonometric length of the standard deviation in the ab plane of the Lab color space representation of the segmented region i in the input image. The parameter $\mu_{i,ab}$ is the distance of the center of gravity in the ab plane to the neutral color axis in the Lab color space representation of the segmented region i in the input image.

d. Producing a Sharpness Map of an Image i. Overview

Figure 16:
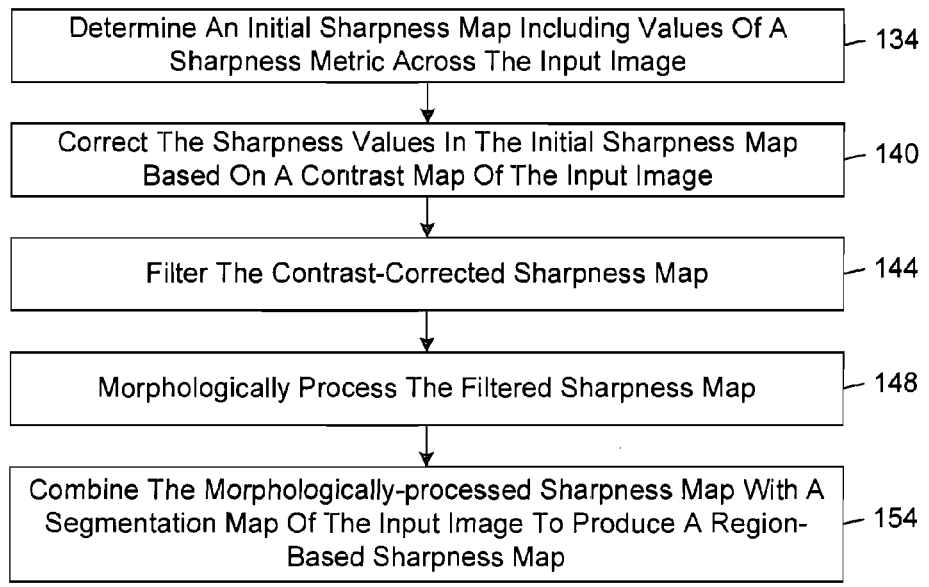
FIG. 16 is a flow diagram of an embodiment of a method of producing a sharpness map of an image.
Figure 17:
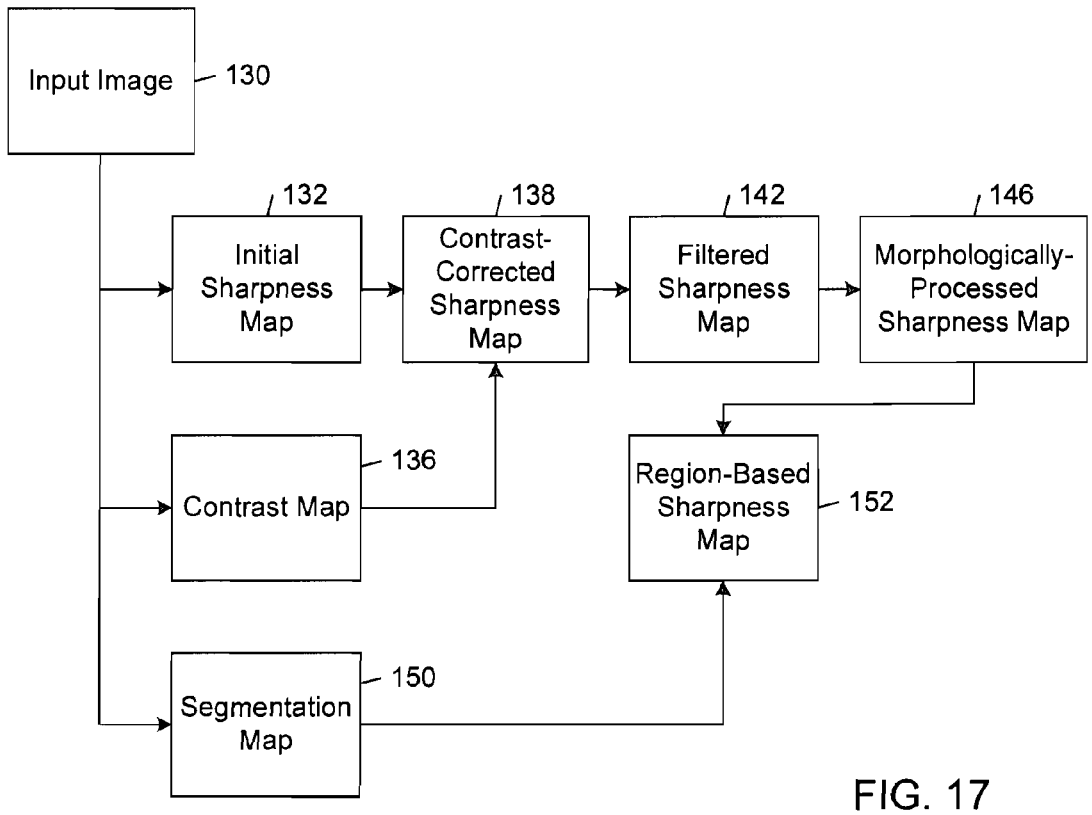
FIG. 17 is a diagrammatic view of various maps that are calculated in accordance with an embodiment of the method if FIG. 16.

FIG. 16 shows an embodiment of a method by which the visual weight modeling engine 12 produces a sharpness map of an input image 130. FIG. 17 shows the various maps that are calculated in accordance with the method of FIG. 16.

In accordance with the method of FIG. 16, the visual weight modeling engine 12 determines an initial sharpness map 132 that includes values of a sharpness metric across the input image 130 (FIG. 16, block 134). The visual weight modeling engine 12 corrects the sharpness values in the initial sharpness map 132 based on a contrast map 136 of the input image 130 to produce a contrast-corrected sharpness map 138 (FIG. 16, block 140). The visual weight modeling engine 12 filters the contrast-corrected sharpness map 138 to produce a filtered sharpness map 142 (FIG. 16, block 144). The visual weight modeling engine 12 morphologically processes the filtered sharpness map 142 to produce a morphologically-processed sharpness map 146 (FIG. 16, block 148). The visual weight modeling engine 12 combines the morphologically-processed sharpness map 146 with a segmentation map 150 of the input image 130 and the contrast-corrected sharpness map 138 to produce a region-based sharpness map 152 (FIG. 16, block 154).

ii. Determining an Initial Sharpness Map (FIG. 16, Block 134)

The visual weight modeling engine 12 may determine the initial sharpness map 132 in any of a wide variety of different ways. In some embodiments, the visual weight modeling engine 12 determines the initial sharpness map 132 in accordance with a noise-robust sharpness estimation process. In an exemplary one of these embodiments, the visual weight modeling engine 12 computes a four-level Laplacian multiresolution pyramid from the input image 130 and combines the four resolution levels of the Laplacian pyramid to produce the initial sharpness map 132 with values that are resistant to high-frequency noise in the input image 130.

iii. Contrast-Correcting the Initial Sharpness Map (FIG. 16, Block 140)

The contrast map 136 that is used to correct the initial sharpness map 132 may be calculated in accordance with one of the contrast map calculation methods described above. In this process, the visual weight modeling engine 12 calculates a respective contrast map for each of three different sliding window sizes (e.g., 3×3, 7×7, and 11×11) and combines these multiresolution contrast maps to form the contrast map 136. In some embodiments, the visual weight modeling engine 12 combines the multiresolution contrast maps by selecting the maximum value of the contrast maps at each image forming location in the input image as the contrast value for the corresponding location in the contrast map 136. In some embodiments, the visual weight modeling engine 12 also performs a morphological dilation on the result of combining the three multiresolution contrast maps. In one exemplary embodiment, the morphological dilation is performed with a dilation factor of 3.

The visual weight modeling engine 12 uses the contrast map 136 to correct the initial sharpness map 132. In this process, the visual weight modeling engine 12 reduces the sharpness values in areas of the sharpness map that correspond to areas of high contrast in the contrast map 136. In some embodiments, the visual weight modeling engine 12 multiplies the sharpness values by different sharpness factors depending on the corresponding contrast values. In some of these embodiments, the contrast-corrected sharpness values $S_{corrected}$ in the contrast-corrected sharpness map 138 are calculated from the initial sharpness values $S_{initial}$ based on the contrast value C at the corresponding image forming value location as follows:

If $C<\Phi$, then, $S_{corrected}=S_{initial}\cdot(1-\alpha\cdot(C-\Phi))$ else $S_{corrected}=S_{initial}\cdot\beta\cdot e^{-\gamma\cdot(C-\Phi)}$ where $\Phi$ is an empirically determined contrast threshold value, and $\alpha$ and $\gamma$ are empirically determined parameter values. In one exemplary embodiment, $\Phi=50$, $\alpha=0.0042$, $\beta=0.8$, and $\gamma=0.024$ In some embodiments, the values of $S_{corrected}$ are truncated at 255.

iv. Filtering the Contrast-Corrected Sharpness Map (FIG. 16, Block 144)

The visual weight modeling engine 12 typically filters the contrast-corrected sharpness map 138 using an edge-preserving smoothing filter to produce a filtered sharpness map 142. This process further distinguishes the sharp regions from the blurred regions. In some embodiments, the visual weight modeling engine 12 filters the contrast-corrected sharpness map 138 with a bilateral Gaussian filter. In one exemplary embodiment, the bilateral Gaussian filter has a window size of 5×5 pixels, a closeness function standard deviation $\sigma_l=10$, and a similarity function standard deviation $\sigma_s=1$.

v. Morphologically Processing the Filtered Sharpness Map (FIG. 16. Block 148)

The visual weight modeling engine 12 morphologically processes the filtered sharpness map 142 to produce a dense morphologically-processed sharpness map 146. In some embodiments, the visual weight modeling engine 12 sequentially performs the morphological operations of closing, opening, and erosion on the filtered sharpness map 142. In one exemplary embodiment, the visual weight modeling engine 12 performs these morphological operations with the following parameters: the closing operation is performed with a closing parameter of 7; the opening operation is performed with an opening parameter of 3; and the erosion operation is performed with an erosion parameter of 5.

vi. Producing the Region-Based Sharpness Map (FIG. 16, Block 154)

The visual weight modeling engine 12 combines the morphologically-processed sharpness map 146 with a segmentation map 150 of the input image 130 to produce a region-based sharpness map 152, which is calculated in accordance with the image segmentation process described above in §IV.B.2. In this process, the visual weight modeling engine 12 assigns a sharpness value (sharpnessValue$_i$) to each of the regions i in the segmentation map 150 based on the sharpness values that are specified in the morphologically-processed sharpness map 146 for the region. The sharpness value that is assigned to a particular region of the region-based sharpness map 152 depends on a weighted accumulation of sharpness values of the image forming elements in the corresponding region of the morphologically-processed sharpness map 146. The weights depend on a multi-tiered thresholding of the sharpness values in the morphologically-processed sharpness map 146, where higher sharpness values are weighted more than lower sharpness values to the accumulated sharpness value assigned to the region. The accumulated weighted sharpness value for each region is averaged over the number of image forming elements in the region that contributed to the accumulated value. In some embodiments, the visual weight modeling engine 12 also detects highly textured regions in the morphologically-processed sharpness map 146 and reduces the average accumulated weighted sharpness values in the detected highly textured regions.

e. Producing a Visual Appeal Map from a Combination of the Contrast Map, the Color Map, and the Sharpness Map The visual weight modeling engine 12 combines the contrast map, the color map, and the sharpness map to produce a visual appeal map of the input image (see FIG. 15, block 126). The contrast map, the color map, and the sharpness map are combined in an additive fashion, since there may be areas with high frequency content (higher sharpness and contrast) but low colorfulness, and vice-versa, with low frequencies, but highly colorful. Both cases are captured in the scoring function described below. In some embodiments a respective value for each of the segmented regions i the visual appeal map is calculated in accordance with the process defined in connection with equations (17) and (18).

If sharpnessDensity$_i$<sharpDensityThres, then $$imageAppealMap_{j \in region_i} = finalSharpnessMap_i + \frac{colorful_i}{A+B \cdot sharpnessDensity_i} + \frac{contrast_i}{C+D \cdot sharpnessDensity_i} \quad (17)$$

If sharpnessDensity$_i \geq$ sharpDensityThres, then $$imageAppealMap_{j \in region_i} = \quad (18)$$
$$finalSharpnessMap_i + \frac{1}{E}colorful_i + \frac{1}{F}contrast_i$$

where the parameters sharpDensityThres, A, B, C, D, E, and F have empirically determined values. In this process, the parameter sharpnessDensity is the percentage of area with sharp objects within a region. In some embodiments, the sharpnessDensity for each region i is calculated in accordance with equation (19).

$$sharpnessDensity_i = \quad (19)$$
$$\frac{1}{n_i} \cdot \sum_{j \in region_i} \begin{cases} 1, & \text{if } rawSharpnessMap_j > rawSharpnessThreshold \\ 0, & \text{if } rawSharpnessMap_j \leq rawSharpnessThreshold \end{cases}$$

where rawSharpnessMap$_j$ is the value of image forming element j in the region i.

Figure 18:
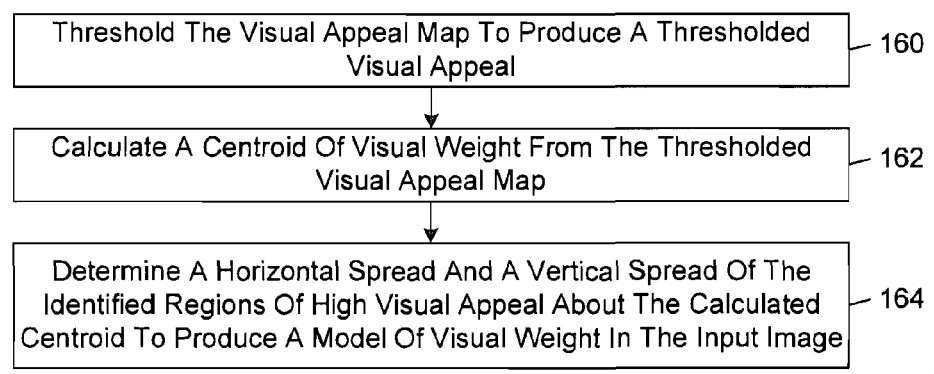
FIG. 18 is a flow diagram of an embodiment of a method of producing a model of visual weight in an image from a visual appeal map of the image.
Figure 19:
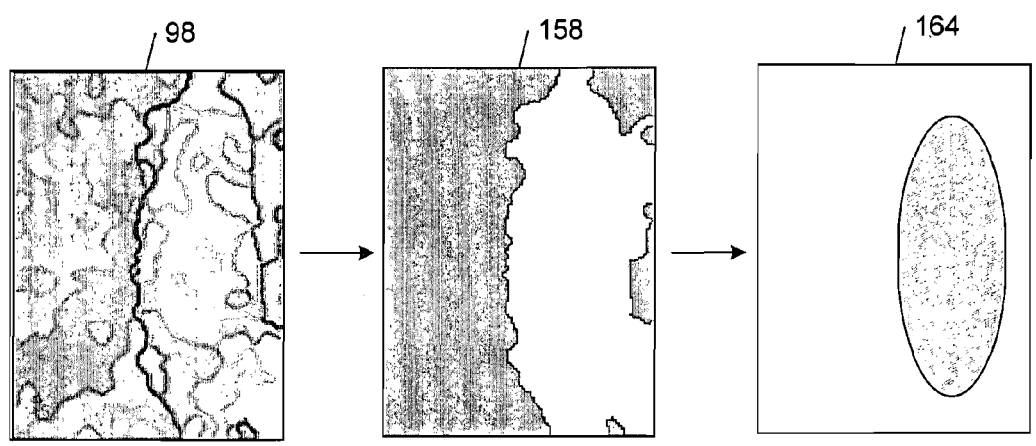
FIG. 19 is a diagrammatic view of various maps that are calculated in accordance with an embodiment of the method of FIG. 18.

4. Producing a Model of Visual Weight in an Image from a Visual Appeal Map of the Image FIG. 18 shows an embodiment of a method by which the visual weight modeling engine 12 produces a model of visual weight in an image from a visual appeal map of the image. FIG. 19 shows various maps that are calculated in accordance with an embodiment of the method of FIG. 18.

In accordance with the method of FIG. 18, the visual weight modeling engine 12 thresholds the visual appeal map 98 to produce a thresholded visual appeal map 158 (FIG. 18, block 160). In some embodiments, the visual weight modeling engine 12 thresholds the values in the visual appeal map 98 with a threshold that is set to 50% of the maximum value in the visual appeal map. In this process, the visual weight modeling engine 12 produce a binary visual appeal map 158 with values of 255 at image forming element locations where the values of the corresponding image forming elements in the visual appeal map 98 are above the threshold and values of 0 at the remaining image forming element locations.

The visual weight modeling engine 12 calculates a centroid of visual weight from the thresholded visual appeal map 158 (FIG. 18, block 162). In some embodiments, the visual weight modeling engine 12 calculates the image centroid by weighting the horizontal and vertical coordinates in the image with the visual appeal values $A_i$ associated with those coordinates.

$$x_{image-centroid} = 100 \cdot \frac{\sum_i x_i \cdot A_i}{D_{image-H} \cdot \sum_i A_i} \quad (20)$$

$$y_{image-centroid} = 100 \cdot \frac{\sum_i y_i \cdot A_i}{D_{image-V} \cdot \sum_i A_i} \quad (21)$$

where $x_i$ and $y_i$ are the x-coordinate and the y-coordinate of image forming element i in the image, $A_i$ is the visual appeal value of pixel i, and $D_{image-H}$ and $D_{image-V}$ are the horizontal and vertical dimensions of the image.

The visual weight modeling engine 12 determines a horizontal spread and a vertical spread of the identified regions of high visual appeal about the calculated centroid to produce a model 164 of visual weight in the input image (FIG. 18, block 166). In some embodiments, the horizontal and vertical spreads ($\sigma_{image-H}$, $\sigma_{image-V}$) correspond to the standard distributions of the visual appeal values Ai about the centroid along the horizontal and vertical dimensions of the image.

$$\sigma_{image-H} = \frac{100}{D_{image-H}} \cdot \sqrt{\frac{\sum_i^Z [(x_i - x_{image-centroid}) \cdot A_i]^2}{Z \cdot \sum_i^Z A_i^2}} \quad (22)$$

$$\sigma_{image-H} = \frac{100}{D_{image-V}} \cdot \sqrt{\frac{\sum_i^Z [(y_i - y_{image-centroid}) \cdot A_i]^2}{Z \cdot \sum_i^Z A_i^2}} \quad (23)$$

where Z is the number of image forming elements in the document.

The visual weight modeling engine 12 creates a respective index 18 from the parameters $\{x_{image-centroid}, y_{image-centroid}, \sigma_{image-H}, \sigma_{image.V}\}$ of each of the visual weight models and associates the respective index to the corresponding image. The visual weight modeling engine 12 may store the indices 18 in a database that is separate from the images 20 (as shown in FIG. 1) or it may store the indices with metadata that is associated with the corresponding ones of the images 20. The visual weight modeling engine 12 typically performs the visual weight modeling process as an offline process.

Other embodiments of the visual weight modeling engine 12 may produce a model of the visual weight distribution in an image from a visual appeal map of the image in ways that are different from the method described above. For example, in some embodiments, the visual weight modeling engine 12 may produce a model of image visual weight from a Gaussian mixture model approximation of the visual appeal map 98. In these embodiments, the parameters of the Gaussian mixture models may be used as the visual weight indices 18 for one or more of the images 20.

C. Retrieving Image Content

As explained above, the compositional balance driven content retrieval system 10 retrieves at least one of the images 20 from a database based on comparisons of the image query with respective ones of the visual weight models (see FIG. 2, block 28). In this process, the visual weight search engine 14 compares the image query to the indices 18 and returns to the user interface 16 ones of the indices 18 that are determined to match the image queries. The visual weight search engine 14 ranks the indices 18 based on a scoring function that produces values indicative of the level of match between the image query and the respective indices 18, which define the respective models of visual weight in the images 20.

In some embodiments, the visual weight search engine 14 ranks the indices 18 based on a scoring function that decreases with increasing spatial distance between the image query and the respective model of visual weight in the image. In some of the embodiments, the scoring function varies inversely with respect to the distance between the centroid specified in the image query and the centroid of the image visual weight model and varies inversely with respect to the respective distance between the horizontal and vertical spreads specified in the image query and the horizontal and vertical spreads of the image visual weight model. Equation (24) defines an exemplary scoring function of this type:

$$Score_i = \frac{1}{1 + f(\Delta_{centroid,i}) + g(\Delta_{spread,i})} \quad (24)$$

Where $\Delta_{centroid,i}$ measures the distance between the centroid specified in the image query and the centroid of the visual weight model of image i, f( ) is a monotonically increasing function of $\Delta_{centroid,i}$, $\Delta_{spread,i}$ measures the distance between the horizontal and vertical spreads specified in the image query and the horizontal and vertical spreads of the visual weight model of image i, and g( ) is a monotonically increasing function of $\Delta_{spread}$. In some embodiments, $\Delta_{centroid,i}$ and $\Delta_{spread,i}$ are defined in equations (25) and (26):

$$\Delta_{centroid,i} = \sqrt{(x_{imagei-centroid} - x_{query-centroid})^2 + (y_{imagei-centroid} - y_{query-centroid})^2} \quad (25)$$

$$\Delta_{spread,i} = \sqrt{(\sigma_{imagei-H} - \sigma_{query-H})^2 + (\sigma_{imagei-V} - \sigma_{query-V})^2} \quad (26)$$

In some embodiments, $f(\Delta_{centroid,i})$ is given by:

$$f(\Delta_{centroid,i}) = \lambda \cdot \Delta_{centroid,i}^\epsilon \quad (27)$$

where $\lambda$ and $\epsilon$ are empirically determined constants. In some exemplary embodiments, $1 \leq \lambda \leq 5$ and $\epsilon = 2$.

In some embodiments, $g(\Delta_{spread,i})$ is given by:

$$g(\Delta_{spread,i}) = \omega \cdot \Delta_{spread,i}^\psi \quad (28)$$

where $\omega$ and $\psi$ are empirically determined constants. In some exemplary embodiments, 1 $1 \leq \omega \leq 5$ and $1 \leq \psi \leq 2$.

In some embodiments the scoring function defined in equation (21) may be scaled by a default or user-selected measure of visual appeal in accordance with equation (29).

$$Score_i = \frac{Q(M_{i,j})}{1 + f(\Delta_{centroid,i}) + g(\Delta_{spread,i})} \quad (29)$$

where $Q(M_{i,j})$ is a quality function of $M_{i,j}$, which is a quality map j of image i. The quality map $M_{i,j}$ may correspond to any of the maps described herein, including but not limited to the visual appeal map, the sharpness map, the contrast map, and the color map. In some embodiments, $Q(M_{i,j})$ is a two-dimensional integral of the quality map $M_{i,j}$.

FIGS. 20-21 shows an exemplary illustration of a process by which the visual weight search engine 14 retrieves an image in response to an image query received from a user 22 who wants to retrieve an image for insertion into the document 56 that achieves a left-right symmetrical balance objective. FIG. 20 shows an exemplary image 170 that has an associated visual weight index that can be accessed by the visual weight search engine 14. FIG. 21 shows graphical representations of the image query visual model 172 and a visual model 174 of the image 170. In FIG. 21, the visual weight model 74 of the document 56 (see FIGS. 8 and 9) is superimposed on the visual weight model 174 of the image 170. FIG. 22 shows the image 170 inserted into the document 56 of FIG. 7. As shown in FIG. 22, the visual weight of the image 170 is predominantly on the left side of the image, whereas the visual weight of the document 56 is predominantly on the right side of the document 56. In this way, the visual weight distribution in the image 170 balances the visual weight distribution in the document 56 to achieve left-right symmetrical balance.

V. EXEMPLARY ARCHITECTURE OF THE COMPOSITIONAL BALANCE DRIVEN CONTENT RETRIEVAL SYSTEM

Embodiments of the compositional balance driven content retrieval system 10 may be implemented by one or more discrete modules (or data processing components) that are not limited to any particular hardware, firmware, or software configuration. In the illustrated embodiments, the modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (e.g., machine-readable code, such as computer software) for implementing the methods that are executed by the embodiments of the compositional balance driven content retrieval system 10, as well as the data is generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the compositional balance driven content retrieval system 10 may be implemented in any one of a wide variety of electronic devices, including desktop computers, workstation computers, and server computers.

Figure 23:
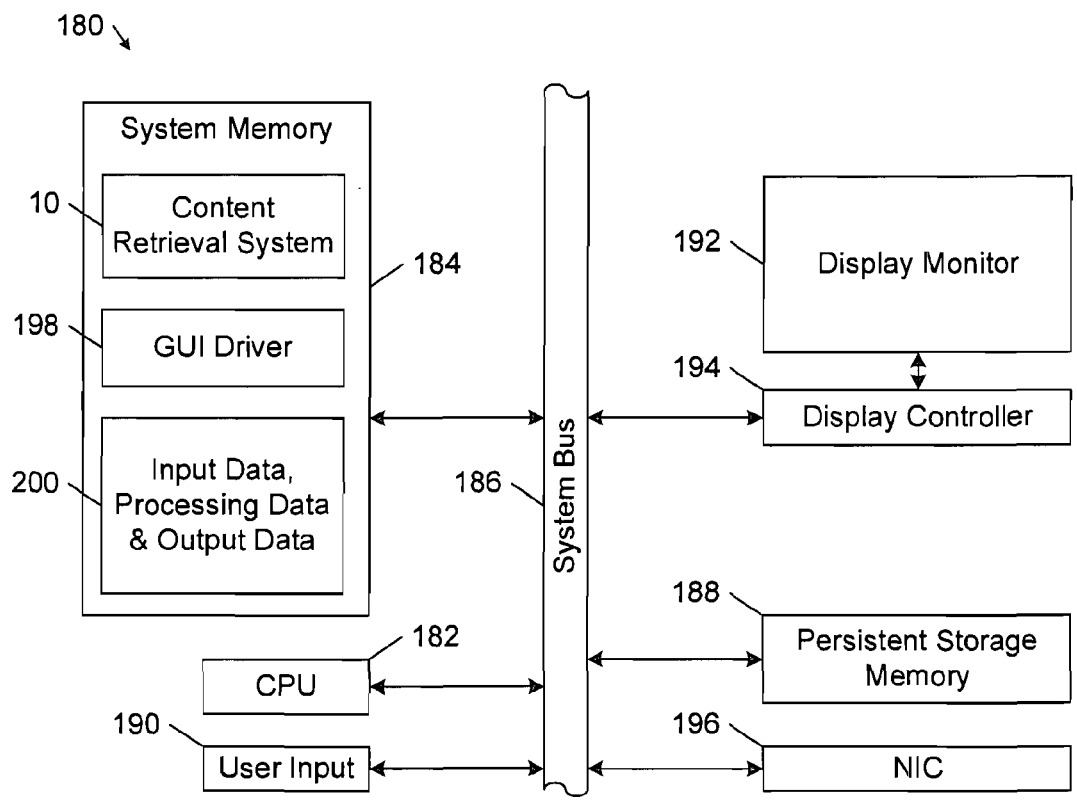
FIG. 23 is a block diagram of an embodiment of a computer system that implements an embodiment of the compositional balance driven content retrieval system of FIG. 1.

FIG. 23 shows an embodiment of a computer system 180 that can implement any of the embodiments of the compositional balance driven content retrieval system 10 that are described herein. The computer system 180 includes a processing unit 182 (CPU), a system memory 184, and a system bus 186 that couples processing unit 182 to the various components of the computer system 180. The processing unit 182 typically includes one or more processors, each of which may be in the form of any one of various commercially available processors. The system memory 184 typically includes a read only memory (ROM) that stores a basic input/output system (BIOS) that contains start-up routines for the computer system 60 and a random access memory (RAM). The system bus 66 may be a memory bus, a peripheral bus or a local bus, and may be compatible with any of a variety of bus protocols, including PCI, VESA, Microchannel, ISA, and EISA. The computer system 60 also includes a persistent storage memory 68 (e.g., a hard drive, a floppy drive, a CD ROM drive, magnetic tape drives, flash memory devices, and digital video disks) that is connected to the system bus 186 and contains one or more computer-readable media disks that provide non-volatile or persistent storage for data, data structures and computer-executable instructions.

A user may interact (e.g., enter commands or data) with the computer 180 using one or more input devices 190 (e.g., a keyboard, a computer mouse, a microphone, joystick, and touch pad). Information may be presented through a graphical user interface (GUI) that is displayed to the user on a display monitor 192, which is controlled by a display controller 194. The computer system 60 also typically includes peripheral output devices, such as speakers and a printer. One or more remote computers may be connected to the computer system 180 through a network interface card (NIC) 196.

As shown in FIG. 23, the system memory 184 also stores the compositional balance driven content retrieval system 10, a GUI driver 198, and at least one database 200 containing input data, processing data, and output data. In some embodiments, the compositional balance driven content retrieval system 10 interfaces with the GUI driver 198 and the user input 190 to present a user interface for managing and controlling the operation of the compositional balance driven content retrieval system 10.

VI. CONCLUSION

The embodiments that are described in detail herein are capable of retrieving images (e.g., digital photographs, video frames, scanned documents, and other image-based graphic objects including mixed content objects) based on specified compositional balance criteria. In some of these embodiments, images are indexed in accordance with models of their respective distributions of visual weight. Images are retrieved based on comparisons of their associated visual weight based indices with the parameters of the compositional balance driven image queries.

Some of these embodiments generate the visual weight based indices from a model of image visual appeal that correlates with visual weight. In this way, these embodiments are able to preferentially retrieve images that not only meet the compositional balance criteria specified in the image queries, but also are visually appealing.

Some embodiments also are able to generate compositional balance driven queries from an analysis of visual weight distribution in a document and a specified compositional balance objective. In this way, these embodiments may be used, for example, in digital publishing application environments to automatically retrieve one or more images that satisfy a compositional balance objective for a document under construction.

Other embodiments are within the scope of the claims.

What is claimed is:

1. A method, comprising:
   determining respective models of visual weight in images, wherein each model of visual weight comprises a respective set of parameters defining a centroid of visual weight of the respective image as a whole and a spread of visual weight in the respective image about the centroid;
   for each of the images:
      identifying areas of the image highest in visual appeal, wherein the identifying, comprises for each of the images:
         segmenting the image into regions;
         assigning a respective visual appeal score to each of the regions; and
         thresholding the image quality scores;
      building the respective model of visual weight in the image to approximate a distribution of the identified area of the image;
   generating an image query from a determined visual weight distribution; and
   retrieving at least one of the images from a database based on comparison of the image query with respective ones of the visual weight models.

2. The method of claim 1, further comprising constructing a model of visual weight in a document, wherein the generating comprises producing the image query from the model of visual weight in the document in accordance with a compositional balance objective for the document.

3. The method of claim 2, wherein the constructing comprises calculating a center of visual weight in the document and determining the model of visual weight in the document based on the calculated center of visual weight.

4. The method of claim 3, wherein the determining comprises modeling the visual weight in the document by an ellipse having a centroid coincident with the center of visual weight in the document.

5. The method of claim 2, wherein the generating comprises geometrically transforming the model of visual weight in the document in accordance with the compositional balance objective, and producing the image query from attributes of the geometrically transformed visual weight model.

6. The method of claim 5, wherein the compositional balance objective is left-right symmetrical balance, and the transforming comprises reflecting the model of visual weight in the document about an axis parallel to a vertical dimension of the document and extending through a central point in the document.

7. The method of claim 5, wherein the compositional balance objective is centered balance, and the transforming comprises reflecting the model of visual weight in the document about an axis inclined with respect to horizontal and vertical dimensions of the document and extending through a central point in the document.

8. The method of claim 1, wherein the retrieving comprises for each of the images calculating a respective score indicating a level of match between the image query and the respective model of visual weight in the image.

9. The method of claim 8, wherein the calculating comprises determining each of the respective scores by evaluating a scoring function that decreases with increasing spatial distance between the image query and the respective model of visual weight in the image.

10. The method of claim 1, wherein the assigning comprises determining a respective sharpness map comprising values of a sharpness metric across the image;
    determining a respective color map comprising values of a color metric across the image;
    determining a respective contrast map comprising values of a contrast metric across the image; and
    combining the respective sharpness map, the respective color map, and the respective contrast map to produce a visual appeal map comprising the visual appeal scores.

11. The method of claim 1, wherein the building comprises for each of the images determining a respective visual center of the identified areas, and modeling the respective model of visual weight in the image by an ellipse having a centroid located at the visual cent of the identified areas.

12. A non-transitory machine readable medium storing machine-readable instructions causing a machine to perform operations comprising:
    determining respective models of visual weight in images, wherein each model of visual weight comprises a respective set of parameters defining a centroid of visual weight of the respective image as a whole and a spread of visual weight in the respective image about the centroid;
    for each of the images:
       identifying areas of the image highest in visual appeal, wherein the identifying, comprises for each of the images:
          segmenting the image into regions;
          assigning a respective visual appeal score to each of the regions; and
          thresholding the image quality scores;
       building the respective model of visual weight in the image to approximate a distribution of the identified area of the image;
    generating an image query from a determined visual weight distribution; and
    retrieving at least one of the images from a database based on comparison of the image query with respective ones of the visual weight models.

13. The machine readable medium of claim 12, wherein the machine-readable instructions cause the machine to perform operations comprising constructing a model of visual weight in a document, and the machine-readable instructions cause a machine to generate the image query from the model of visual weight in the document in accordance with a compositional balance objective for the document.

14. The machine readable medium of claim 12, wherein the machine-readable instructions cause the machine to calculate for each of the images a respective score indicating a level of match between the image query and the respective model of visual weight in the image.

15. An apparatus, comprising:
    a memory storing processor-readable instructions;
    a processor coupled to the memory, operable to execute the instructions, and based at least in part on the execution of the instructions operable to perform operations comprising:
       determining respective models of visual weight in images, wherein each model of visual weight comprises a respective set of parameters defining a centroid of visual weight of the respective image as a whole and a spread of visual weight in the respective image about the centroid;
       for each of the images:
          identifying areas of the image highest in visual appeal, wherein the identifying, comprises for each of the images:
             segmenting the image into regions;
             assigning a respective visual appeal score to each of the regions;

and
thresholding the image quality scores;
building the respective model of visual weight in the image to approximate a distribution of the identified area of the image;
generating an image query from a determined visual weight distribution; and
retrieving at least one of the images from a database based on comparison of the image query with respective ones of the visual weight models.

16. The apparatus of claim 15, wherein based at least in part on the execution of the instructions the processor is operable to perform operations comprising constructing a model of visual weight in a document and producing the image query from the model of visual weight in the document in accordance with a compositional balance objective for the document.

17. The apparatus of claim 15, wherein based at least in part on the execution of the instructions the processor is operable to perform, for each of the images, operations comprising calculating a respective score indicating a level of match between the image query and the respective model of visual weight in the image.

* * * * *